(12) United States Patent
Stuhlsatz et al.

(10) Patent No.: US 8,473,655 B2
(45) Date of Patent: Jun. 25, 2013

(54) METHOD AND APPARATUS FOR DIVIDING A SINGLE SERIAL ENCLOSURE MANAGEMENT BIT STREAM INTO MULTIPLE ENCLOSURE MANAGEMENT BIT STREAMS AND FOR PROVIDING THE RESPECTIVE BIT STREAMS TO RESPECTIVE MIDPLANES

(75) Inventors: Jason M. Stuhlsatz, Dacula, GA (US); Naman Nair, Fremont, CA (US); Debal Krishna Mridha, Bangalore, IN (US); Lakshmana Anupindi, Suwanee, GA (US); Kakanuru Lakshmi Kanth Reddy, Bangalore, IN (US)

(73) Assignee: LSI Corporation, Milpitas, CA (US)

( * ) Notice: Subject to any disclaimer, the term of this patent is extended or adjusted under 35 U.S.C. 154(b) by 44 days.

(21) Appl. No.: 13/007,687

(22) Filed: Jan. 17, 2011

(65) Prior Publication Data

US 2012/0185626 A1   Jul. 19, 2012

(51) Int. Cl.
*G06F 3/00* (2006.01)
*G06F 13/12* (2006.01)
*G06F 13/38* (2006.01)
*G06F 13/00* (2006.01)

(52) U.S. Cl.
USPC ....... 710/74; 710/1; 710/46; 710/65; 710/100

(58) Field of Classification Search
USPC .................. 710/74, 1, 46, 65, 100
See application file for complete search history.

(56) References Cited

U.S. PATENT DOCUMENTS

| | | | | |
|---|---|---|---|---|
| 6,833,634 | B1 * | 12/2004 | Price | 307/18 |
| 7,319,705 | B1 * | 1/2008 | Wu et al. | 370/534 |
| 7,380,088 | B2 * | 5/2008 | Wang et al. | 711/170 |
| 7,685,329 | B1 * | 3/2010 | Sivertsen | 710/15 |
| 7,734,839 | B1 * | 6/2010 | Sivertsen | 710/11 |
| 7,908,407 | B1 * | 3/2011 | Sivertsen | 710/11 |
| 8,078,770 | B1 * | 12/2011 | Sivertsen | 710/19 |
| 2001/0049756 | A1 * | 12/2001 | Liu | 710/33 |
| 2002/0004871 | A1 * | 1/2002 | Liu | 710/305 |
| 2002/0038401 | A1 * | 3/2002 | Zaidi et al. | 710/305 |
| 2004/0030816 | A1 * | 2/2004 | Knight et al. | 710/52 |
| 2006/0075168 | A1 * | 4/2006 | Warren et al. | 710/65 |
| 2007/0283058 | A1 * | 12/2007 | Warren et al. | 710/65 |
| 2009/0089473 | A1 | 4/2009 | He | |
| 2010/0284275 | A1 * | 11/2010 | Martinez et al. | 370/231 |

\* cited by examiner

*Primary Examiner* — Idriss N Alrobaye
*Assistant Examiner* — Getente A Yimer

(57) ABSTRACT

A controller is provided that receives a single enclosure management (EM) serial bit stream from an expander or other device and divides the EM serial bit stream into multiple EM serial bit streams for delivery to multiple respective midplanes or backplanes. In this way, a separate EM serial bit stream is provided to each midplane or backplane without having to increase the number of ports that are available on the expander or other device that interfaces with the backplane or midplane.

22 Claims, 11 Drawing Sheets

METHOD AND APPARATUS FOR DIVIDING A SINGLE SERIAL ENCLOSURE MANAGEMENT BIT STREAM INTO MULTIPLE ENCLOSURE MANAGEMENT BIT STREAMS AND FOR PROVIDING THE RESPECTIVE BIT STREAMS TO RESPECTIVE MIDPLANES

TECHNICAL FIELD OF THE INVENTION

The invention relates generally to data storage systems and, more particularly, to a method and apparatus for dividing a single enclosure management serial bit stream into multiple respective enclosure management serial bit streams and for providing the respective bit streams to respective midplanes.

BACKGROUND OF THE INVENTION

A storage array or disk array is a data storage system that includes multiple magnetic hard disk drives or similar persistent storage units. A storage array can allow large amounts of data to be stored in an efficient manner. The disk drives of the array are often contained in slots on one or more midplanes or backplanes. A server is typically connected to the midplane or backplane via a host bus adapter (HBA). Each midplane or backplane typically includes a controller that communicates with the server via cables and connectors that connect the midplane or backplane to the HBA. Several different interfaces are used for this purpose, including, for example, the Serial Attached Small Computer Systems Interface (SAS) interface and the Serial Advanced Technology Attachment (SATA) interface. The midplane or backplane is sometimes equipped with a port expander that allows the number of disk drives that are incorporated into the array to be increased. If an expander is used, the expander is connected to the HBA of the server and to the backplane or midplane.

In order to provide an operator of the data storage system with information about the presence of disk drives in the slots and the status of the disk drives, enclosure management (EM) data is typically communicated between the HBA and the expander and between the expander and the backplane or midplane. Two protocols that are widely used to communicate EM data are the Serial General Purpose Input/Output (SGPIO) protocol and the inter-integrated circuit ($I^2C$) protocol. Proprietary protocols are also used for this purpose. The EM data is used to generate drive signals that drive light-emitting diodes (LEDs). The states of the LEDs visually indicate status information about the respective disk drives, such as presence in the slot, activity, failure, and rebuild status.

Many multi-port devices, such as SAS expanders, typically have one or two SGPIO ports for outputting one or two SGPIO bit streams, respectively, to one or two backplanes or midplanes, respectively. Each SGPIO bit stream contains enclosure management bits associated with the disk drives that are in the slots of the respective backplane or midplane. No more than one or two SGPIO ports are provided on the SAS expander due to limitations on the pin count of the expander. Consequently, no more than one or two SGPIO bit streams can be output from the SAS expander to the midplane or backplane. This limits the number of backplanes or midplanes that can be supported by the expander with respect to SGPIO enclosure management data.

Likewise, in cases where the expander is not supported and the $I^2C$ protocol is used instead, a single $I^2C$ enclosure management bit stream is provided from the expander to the backplane or midplane. This limits the number of backplanes or midplanes that can be supported by the expander or other device with respect to $I^2C$ enclosure management data.

A need exists for a way to increase the number of enclosure management bit streams that can be provided to backplanes or midplanes without requiring an increase in the number of ports, and thus the number of pins, that are available on an expander or other device that interfaces with the backplane or midplane.

SUMMARY OF THE INVENTION

The invention provides a method and an apparatus for dividing at least one EM serial bit stream into a plurality of EM serial bit streams to be output to a plurality of midplanes. The apparatus comprises a controller and at least a first EM separator within the controller. The controller includes at least a first EM input port for receiving an input EM serial bit stream and N EM output ports for outputting N EM serial bit streams from the controller, where N is a positive integer that is equal to or greater than 2. The first EM separator within the controller divides the input EM serial bit stream into N EM serial bit streams and causes each of the N EM serial bit streams to be output from the controller via a respective one of the N EM output ports to N respective midplanes, each of which has at least one respective disk drive attached thereto.

In accordance with one embodiment, the controller has at least first and second EM input ports, at least a separator, at least a connection manager, and at least N multiplexors (MUXes), where N is a positive integer that is equal to or greater than 2. The first EM input port receives a first input EM serial bit stream of a first type. The second EM input port receives input EM bits of a second type. The first EM separator within the controller divides the first input EM serial bit stream into N EM serial bit streams of the first type. Each MUX has at least first and second input terminals, an output terminal, and a selector terminal. The first and second input terminals of each MUX receive a respective bit of the N EM serial bit streams of the first type from the separator and a respective bit of the N EM bits of the second type from the connection manager. Each of the MUXes receives a respective selection bit from a respective midplane at the respective selector terminal and causes either the EM bit of the first type at the first input terminal or the EM bit of the second type at the second input terminal to be output from the respective MUX on the respective output terminal based on whether or not the respective selection bit is asserted. The EM serial bit streams that are output on the output terminals of the MUXes are output from the controller via respective EM output ports of the controller and provided to N respective midplanes.

In accordance with one embodiment, the method comprises: in a controller, receiving an input EM serial bit stream, dividing the input EM serial bit stream into N EM serial bit streams, where N is a positive integer that is equal to or greater than 2, and causing each of the N EM serial bit streams to be provided via a respective EM output port of the controller to a respective midplane of the N respective midplanes. Each of the midplanes has at least one respective disk drive attached thereto.

In accordance with another embodiment, the method comprises: in a controller, receiving a first input EM serial bit stream of a first type and second input EM bits of a second type; with a separator of the controller, dividing the first input EM serial bit stream into N EM serial bit streams of the first type; providing the EM bits of the N EM serial bit streams of the first type to first input terminals of N MUXes of the controller and providing the EM bits of the second type to second input terminals of the N MUXes; providing respective selection bits received from N respective midplanes to respective selector terminals of the respective MUXs; and, based on whether or not the respective selection bit is asserted, causing either the EM bit of the first type at the respective first input terminal of the respective MUX or the EM bit of the second type at the respective second input terminal of the respective MUX to be output from the respective MUX on the respective output terminal. The EM bits that are output on the output terminals of the MUXes are output from the controller via respective EM output ports of the controller and provided to N respective midplanes.

These and other features and advantages of the invention will become apparent from the following description, drawings and claims.

DETAILED DESCRIPTION OF ILLUSTRATIVE EMBODIMENTS

In accordance with embodiments of the invention, a controller is provided that receives a single enclosure management (EM) serial bit stream from an expander or other device and divides the EM serial bit stream into multiple EM serial bit streams for delivery to multiple respective midplanes or backplanes. In this way, a separate EM serial bit stream is provided to each midplane or backplane without having to increase the number of ports that are available on the expander or other device that interfaces with the backplane or midplane.

Figure 1:
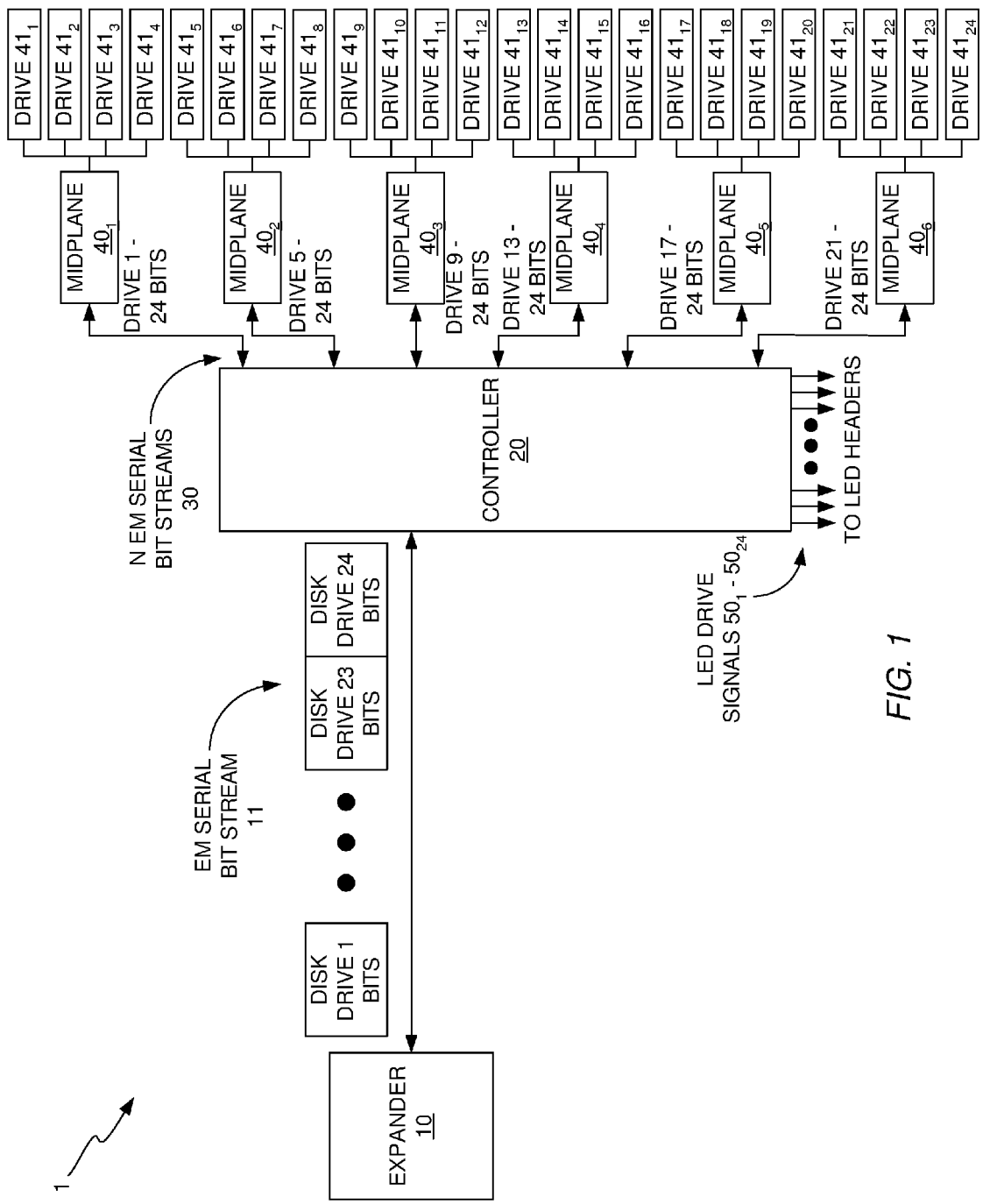
FIG. 1 illustrates a block diagram of a data storage system 1 in accordance with an illustrative, or exemplary, embodiment.

FIG. 1 illustrates a block diagram of a data storage system 1 in accordance with an illustrative, or exemplary, embodiment. In accordance with this illustrative embodiment, the system 1 includes an SAS expander 10. It should be noted, however, that the invention applies equally to other types of expanders and similar devices, and also to embodiments in which the HBA or a Redundant Array Of Inexpensive Disks (RAID) adapter of a server interfaces directly with a backplane or midplane. For ease of illustration and in the interest of brevity, the illustrative embodiment will be described only with reference to an SAS expander interfacing with a backplane or midplane. Because backplanes and midplanes have similar attributes, the term "midplane" will be used hereinafter to denote any device configured to perform the functions of a backplane or midplane.

The SAS expander 10 of the system 1 outputs an EM serial bit stream 11. In known data storage systems, an SAS expander would typically be connected to one or more midplanes. In accordance with this embodiment of the invention, however, the SAS expander 10 is connected to a controller 20, which, in turn, is connected to a plurality of midplanes 40. The controller 20 comprises an embodiment of the apparatus of the invention, although the apparatus may comprise more elements, components or features than the controller 20. Each of the midplanes 40 has a plurality of disk drives 41 connected thereto, e.g., contained in respective slots (not shown) of the midplanes 40. The system 1 is typically, but not necessarily, contained within a server enclosure (not shown).

In accordance with this illustrative embodiment, the EM serial bit stream 11 is a SGPIO serial bit stream that contains EM bits for M disk drives 41, where M is a positive integer that is greater than 1. The EM serial bit stream 11 could be another type of serial bit stream such as, for example, an $I^2C$ serial bit stream. The controller 20 is configured to receive the EM serial bit stream 11 and to parse, or divide, the EM serial bit stream 11 into N EM serial bit streams 30, where N is a positive integer that is less than or equal to M. Each of the EM serial bit streams 30 is sent to a respective midplane 40. Each midplane 40 has at least one of the disk drives 41 attached thereto, e.g., secured within a slot of the midplane 40. The system 1 comprises at least N midplanes 40. Thus, there is typically one EM serial bit stream 30 per midplane 40. The controller 20 has a list that associates the disk drives 41 with the respective midplanes 40 to allow the controller 20 to ascertain which of the disk drives 41 are attached to which of the midplanes 40. Each midplane 40 is attached to some subset of the set of all of the disk drives 41. The controller 20 uses this list to divide the EM serial bit stream 11 output from the SAS expander 10 into the respective EM serial bit streams 30 and to cause the respective EM serial bit streams 30 to be sent to the respective midplanes 40.

For exemplary purposes, it will be assumed that there are a total of twenty-four disk drives $41_1$-$41_{24}$ (i.e., M=24) attached to six midplanes $40_1$-$40_6$ (i.e., N=6). It will also be assumed in this example that each midplane $40_1$-$40_6$ has four of the disk drives 41 attached thereto. Thus, in accordance with this example, the controller 20 divides the EM serial bit stream 11 into six EM serial streams $30_1$-$30_6$., i.e., one EM serial bit stream 30 per midplane 40.

The first EM serial bit stream $30_1$, which is sent by the controller 20 to the first midplane $40_1$, contains EM bits for the disk drives $41_1$-$41_4$ attached to the midplane $40_1$ and also contains EM bits for the disk drives $41_5$-$41_{24}$ attached to the other midplanes $40_2$-$40_6$. However, because only disk drives $41_1$-$41_4$ are attached to the midplane $40_1$, the midplane $40_1$ will ignore the EM bits associated with disk drives $41_5$-$41_{24}$.

The second EM serial bit stream $30_2$, which is sent by the controller 20 to the second midplane $40_2$, contains EM bits for the disk drives $41_5$-$41_8$ attached to the midplane $40_2$ and also contains EM bits for the disk drives $41_9$-$41_{24}$ attached to the other midplanes $40_3$-$40_6$. Because only disk drives $41_5$-$41_8$ are attached to the midplane $40_2$, the midplane $40_2$ will ignore the EM bits associated with disk drives $41_9$-$41_{24}$.

The third EM serial bit stream $30_3$, which is sent by the controller 20 to the third midplane $40_3$, contains EM bits for the disk drives $41_9$-$41_{12}$ attached to the third midplane $40_3$ and also contains EM bits for the disk drives $41_{13}$-$41_{24}$ attached to the other midplanes $40_4$-$40_6$. Because only disk drives $41_9$-$41_{12}$ are attached to the midplane $40_{3 the\ midplane\ 403}$ will ignore the EM bits associated with disk drives $41_{13}$-$41_{24}$.

The fourth EM serial bit stream $30_4$, which is sent by the controller 20 to the fourth midplane $40_4$, contains EM bits for the disk drives $41_{13}$-$41_{16}$ attached to the fourth midplane $40_4$ and also contains EM bits for the disk drives $41_{17}$-$41_{24}$ attached to the other midplanes $40_5$-$40_6$. Because only disk drives $41_{13}$-$41_{16}$ are attached to the midplane $40_4$, the midplane $40_4$ will ignore the EM bits associated with disk drives $41_{17}$-$41_{24}$.

The fifth EM serial bit stream $30_5$, which is sent by the controller 20 to the fifth midplane $40_5$, contains EM bits for the disk drives $41_{17}$-$41_{20}$ attached to the fifth midplane $40_5$ and also contains EM bits for the disk drives $41_{21}$-$41_{24}$ attached to the midplane $40_6$. Because only disk drives $41_{17}$-$41_{20}$ are attached to the midplane $40_5$, the midplane $40_5$ will ignore the EM bits associated with disk drives $41_{21}$-$41_{24}$.

The sixth EM bit stream $30_6$, which is sent by the controller 20 to the sixth midplane $40_6$, contains EM bits for the disk drives $41_{21}$-$41_{24}$ attached to the sixth midplane $40_6$.

Thus, it can be seen from the example above that each EM serial bit stream 30 received by each midplane 40 includes EM bits for the disk drives 41 attached to that midplane 40 as well as the EM bits for all higher-numbered disk drives 41 attached to higher-numbered midplanes 40. This feature ensures that the EM bits associated with all of the disk drives 41 will be received by the respective midplanes 40 even in cases in which some midplanes 40 have more disk drives 41 attached to them than others. This feature also allows midplanes 40 to be added to and removed from the system 1 without adversely affecting operations of the system 1. For example, if midplane $40_2$ is removed and midplane $40_1$ is replaced with an eight-disk drive midplane, then because midplane $40_1$ already receives the EM bits associated with disk drive $41_1$-$41_8$, it will simply use those bits instead of ignoring them. In this example, the bit stream 30 that is intended for midplane $40_2$ will simply be ignored.

As indicated above, the EM bits are used to drive LEDs (not shown) to visually indicate status information about the respective disk drives 41, such as presence in the slot, activity, fault, and rebuild status. The LEDs that display these types of status information are typically mounted on the midplanes 40, but may be mounted in other locations. Because the controller 20 parses the SGPIO bit stream 11, it ascertains, during the parsing process, which bits are associated with which disk drives 41. In accordance with this embodiment, the respective fault bits associated with each respective disk drive 41 are used to produce respective LED drive signal $50_1$-$50_{24}$ that may be used to drive the respective fault LEDs.

Figure 2:
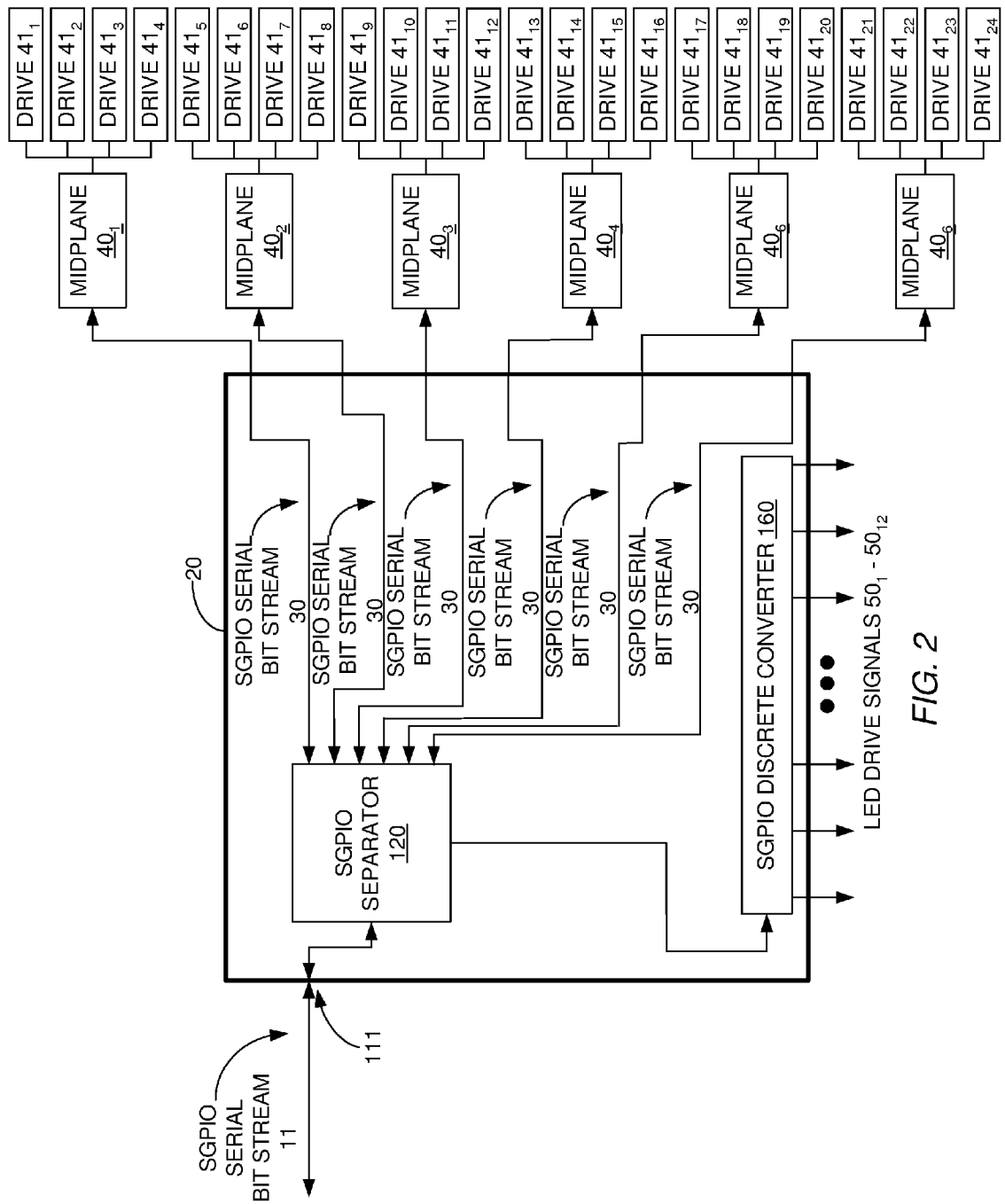
FIG. 2 illustrates a block diagram of the controller of the data storage system shown in FIG. 1 in accordance with an illustrative or exemplary embodiment.

FIG. 2 illustrates a block diagram of the controller 20 of the data storage system 1 shown in FIG. 1 in accordance with an illustrative or exemplary embodiment. Like numerals in FIGS. 1 and 2 represent like elements or features. An SGPIO port 111 of the controller 20 is configured to receive the SGPIO serial bit stream 11 (FIG. 1) from the SAS expander. The controller 20 includes an SGPIO separator 120 that receives the SGPIO bit stream 11 at its input and performs the aforementioned process of dividing the SGPIO bit stream 11 into N SGPIO bit streams 30. The N SGPIO serial bit streams 30 output from the controller 20 are input to the respective midplanes $40_1$-$40_6$ and used or ignored by the midplanes $40_1$-$40_6$ in the manner described above with reference to FIG. 1. The aforementioned logic of the controller 20 that generates the drive signals $50_1$-$50_{24}$ for the fault LEDs is represented in FIG. 2 by the box labeled "SGPIO Discrete Converter 160".

Figure 3:
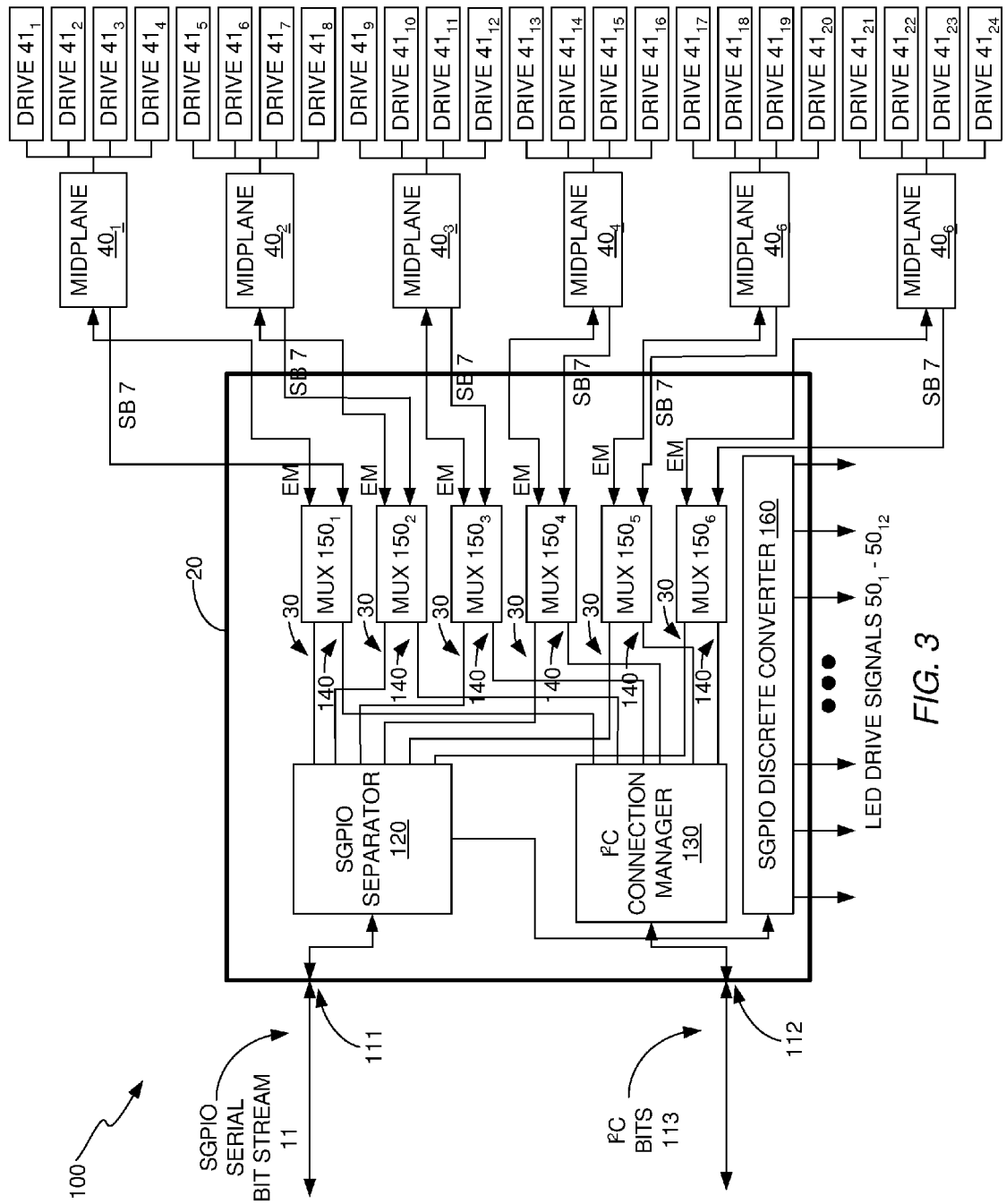
FIG. 3 illustrates a block diagram of the data storage system in accordance with another illustrative or exemplary embodiment.

FIG. 3 illustrates a block diagram of the data storage system 100 in accordance with another illustrative or exemplary embodiment. Like numerals in FIGS. 1 and 3 represent like elements or features. A standard known as the Small Form Factor (SFF) standard SFF-8087 governs SGPIO signal assignments. In that standard, the sideband 7 (SB 7) bit is not assigned, but is reserved. Another standard known as the SFF-8448 standard specifies sideband signal assignments that allow an I²C interface to be implemented on the same pins on which the SGPIO interface is normally implemented. In accordance with the embodiment of FIG. 3, the SB 7 bit is used to select between an SGPIO port 111 on the controller 20 and an I²C port 112 on the controller 20 depending on whether the SGPIO protocol or the I²C protocol, respectively, is being used. In this way, the system 100 supports both the SGPIO protocol and the I²C protocol.

The SGPIO port 111 of the controller 20 is configured to receive the SGPIO serial bit stream 11 (FIG. 1). The I²C port 112 is configured to receive I²C bits 113. The controller 20 includes an SGPIO separator 120 that receives the SGPIO bit stream at its input and an I²C connection manager 130 that receives the I²C bits at its input. The SGPIO separator 120 performs the aforementioned process of dividing the SGPIO bit stream 11 into N SGPIO bit streams 30. The I²C connection manager 130 performs connection management functions that determine which of the midplanes 40 the received I²C bits are destined for and then causes the bits to be sent to N 2-to-1 multiplexors (MUXes) 150. The N 2-to-1 MUXes 150 receive the SB 7 bits at their selector terminals and receive the SGPIO bit streams 30 and the I²C bits 140, respectively, at their input terminals. If an SB 7 bit is asserted, the corresponding MUX 150 will select the SGPIO bit stream 30 to be output to the corresponding midplane 40. If an SB 7 bit is deasserted, the corresponding MUX 150 will select the corresponding I²C bits 140 to be output to the corresponding midplanes 40.

Importantly, because separate MUXes 150 are used and because the MUXes 150 are selected by SB 7 bits that are independent of one another, one or more midplanes 40 may implement the SGPIO protocol while one or more other midplanes 40 implement the I²C protocol. This feature provides the data storage system 100 with great flexibility with respect to the types of midplanes 40 and disk drives 41 that can be used in the system 100 and with respect to the manner in which the midplanes 40 and the disk drives 41 are configured. A specific example of the manner in which the system 100 may operate will now be described with reference to FIG. 3. For this example, the following will be assumed: (1) midplanes $40_1$-$40_3$ implement the SGPIO interface and protocol; (2) midplanes $40_4$-$40_6$ implement the I²C interface and protocol; and (3) four of the disk drives 41 are connected to each of the midplanes 40.

The SB 7 bit is asserted at MUXes $150_1$-$150_3$ and deasserted at MUXes $150_4$-$150_6$. Therefore, MUXes $150_1$-$150_3$ will select the SGPIO serial bit streams 30 to be output to midplanes $40_1$-$40_3$ and MUXes $150_4$-$150_6$ will select the respective I²C bits 140 to be output to the respective midplanes $40_4$-$40_6$. In this way, the midplanes $40_1$-$40_3$ that implement the SGPIO interface and protocol will handle SGPIO EM bits and the midplanes $40_4$-$40_6$ that implement the I²C interface and protocol will handle I²C EM bits. It should be noted that although the SB 7 bit is used as the selection bit for the MUXes 150 in this exemplary embodiment, a bit other than the SB 7 bit may be used for this purpose, as will be understood by persons skilled in the art in view of the description being provided herein. As with the embodiment described above with reference to FIGS. 1 and 2, each EM serial bit streams output to the midplanes 40 includes EM bits associated with the disk drives 41 that are attached to the respective midplane 40 as well as the EM bits associated with higher-numbered disk drives 41 attached to higher-numbered midplanes 40. Each midplane 40 uses the EM bits associated with the disk drives 41 attached thereto and ignores the EM bits associated with higher-numbered disk drives 41 attached to higher-numbered midplanes 40. It should also be noted that the SB 7 or other indicator signal can also be overridden by the expander 10 via a command protocol such as I²C on one of the input ports of the controller 20 in the event the midplane 40 does not use indicator signals to specify the intended EM protocol.

Figure 4:
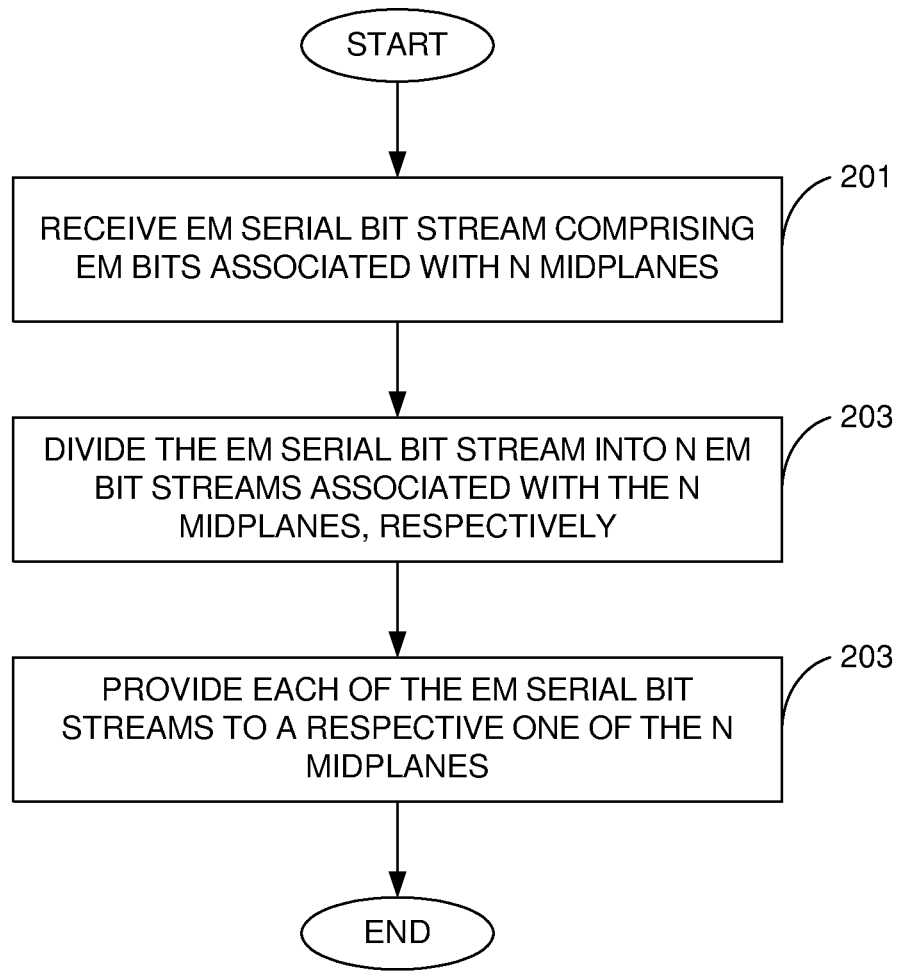
FIG. 4 illustrates a flowchart representing an embodiment of the method performed by the data storage system shown in FIG. 1.

FIG. 4 illustrates a flowchart representing the method performed by the data storage system 1 shown in FIG. 1. A controller receives an EM serial bit stream, as indicated by block 201. The controller divides the EM serial bit stream into N EM serial bit streams, as indicated by block 203. Each of the N EM serial bit streams is associated with a respective midplane. Each of the N EM serial bit streams is then provided to one of the N midplanes, as indicated by block 205. Each of the N EM bit streams includes EM bits associated with the disk drives that are attached to the respective midplanes as well as the EM bits associated with higher-numbered disk drives attached to higher-numbered midplanes. Each midplane uses the EM bits associated with the disk drives attached thereto and ignores the EM bits associated with higher-numbered disk drives attached to higher-numbered midplanes.

Figure 5:
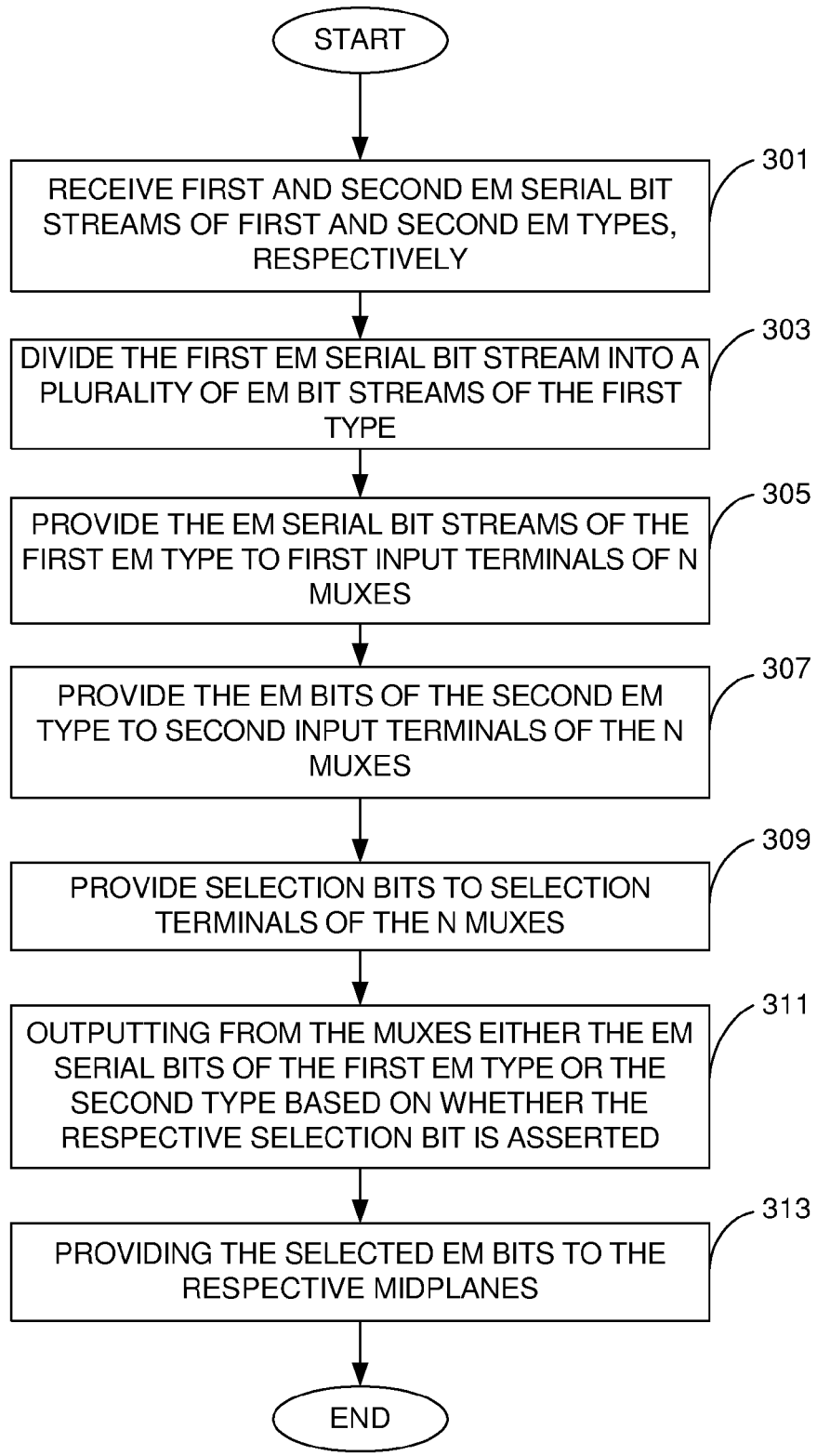
FIG. 5 illustrates a flowchart representing an embodiment of the method performed by the data storage system shown in FIG. 3.

FIG. 5 illustrates a flowchart representing the method performed by the data storage system 100 shown in FIG. 3. A controller receives an EM serial bit stream of a first EM type and EM bits of a second EM type, as indicated by block 301. As indicated above with reference to FIG. 3, the first and second EM types are types SGPIO and I²C, respectively. The controller divides the first EM serial bit stream into a plurality of EM serial bit streams of the first type, as indicated by block 303. Each one of the plurality of EM serial bit streams of the first EM type is associated with a respective midplane. Each one of the plurality of EM serial bit streams is then provided to one of N 2-to-1 MUXes such that each MUX receives an EM serial bit stream of the first type at one of its input terminals, as indicated by block 305. Respective bits of the second EM type are provided to the other input terminals of the MUXes, as indicated by block 307.

A respective selection bit received in the controller from a respective midplane is applied to the respective selector terminals of each of the MUXes, as indicated by block 309. As indicated above, the selection bits are typically, but not necessarily, the SB 7 bit. Each of the MUXes then outputs either an EM bit of the first or of the second type based on whether the selection bit at its selector terminal is asserted or deasserted, as indicated by block 311. Each EM bit output from the MUXes is then provided to a respective midplane, as indicated by block 313. As indicated above with reference to FIGS. 1 and 3, the EM bits output from each MUX include EM bits associated with the disk drives that are attached to the respective midplane as well as the EM bits associated with higher-numbered disk drives attached to higher-numbered midplanes. Each midplane uses the EM bits associated with the disk drives attached thereto and ignores the EM bits associated with higher-numbered disk drives attached to higher-numbered midplanes.

While the methods described above with reference to FIGS. 4 and 5 are typically implemented in hardware logic inside of the controller 20, all or portions of these processes may be implemented in software and/or firmware. If software and/or firmware is used for this purpose, the corresponding computer code will be stored on a computer-readable medium (CRM) device that is internal to or external to the controller 20 and accessible thereby. Any type of suitable CRM device may be used for this purpose, including, but not limited to, solid state devices such as random access memory (RAM) devices, read-only memory (ROM) devices, programmable ROM (PROM), erasable PROM (EPROM), and flash memory, as well as non-solid state devices such as magnetic and optical storage devices.

It should be noted that while exemplary or illustrative embodiments of the invention have been described above with reference to the controller 20 receiving the EM serial bit stream 11 from an expander 10, the EM serial bit stream 11 could instead be output from some other device, such as, for example, an HBA (not shown) or a RAID adapter (not shown), as will now be described with reference to FIGS. 6A-6F. The invention is not limited with respect to the type of device that delivers the EM serial bit stream 11 to the controller 20.

FIGS. 6A-6F illustrate block diagrams of the data storage system in accordance with different illustrative embodiments in which different configurations of backplanes are used. A high port count (HPC) adapter 410, such as an HBA or a Raid adapter, for example, replaces the expander 10 shown in FIG. 1. Although not shown in FIGS. 6A-6F for ease of illustration, the controller 20 shown in FIGS. 1-3 is part of the HPC adapter 410 shown in FIGS. 6A-6F. Like numerals in FIGS. 6A-6F represent like components or features.

Figure 6A:
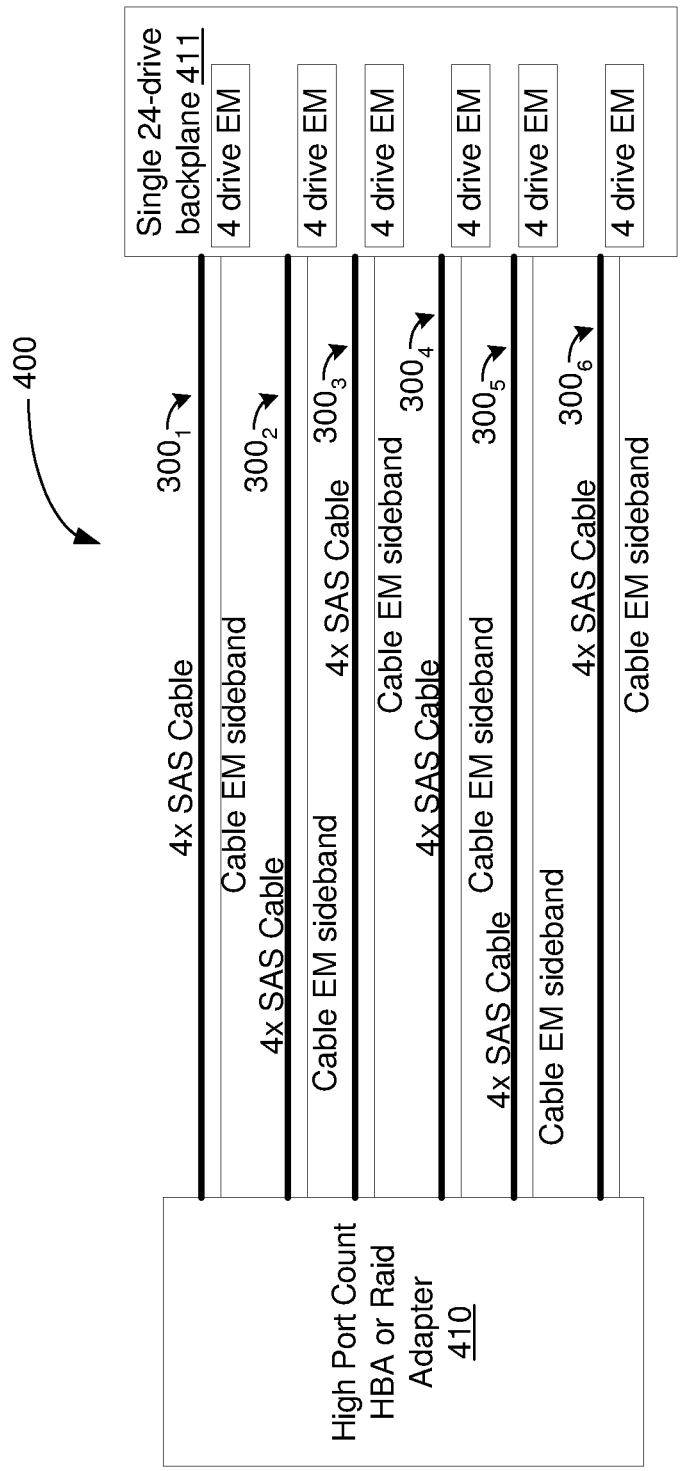
FIGS. 6A-6F illustrate block diagrams of the data storage system in accordance with different illustrative embodiments in which different configurations of backplanes are used.

In the storage system 400 of FIG. 6A, six 4× SAS cables, each including an EM sideband, interconnect the HPC adapter 410 with a single 24-disk drive backplane 411 having six groups of four disk drives attached thereto. Each 4× SAS cable delivers four of the N EM bit streams from the adapter 410 to the backplane 411, which then provides the corresponding EM bits to the corresponding disk drives.

Figure 6B:
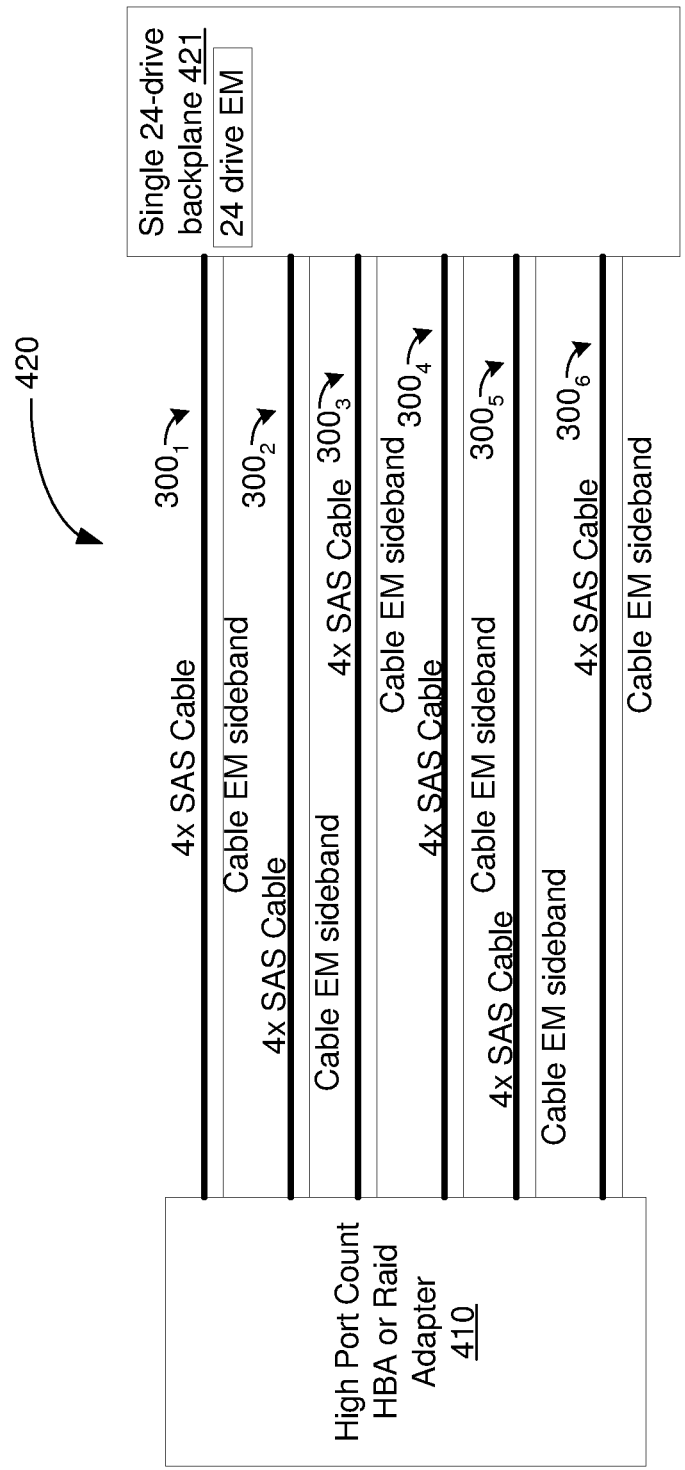

In the storage system 420 of FIG. 6B, six 4× SAS cables, each including an EM sideband, interconnect the HPC adapter 410 with a single twenty-four-disk drive backplane 421 having twenty-four disk drives attached thereto, but only one EM device (not shown) in the backplane 421 for handling all twenty-four drives using the first cable's EM bit stream $300_1$. Each 4× SAS cable delivers four of the N EM bit streams from the adapter 410 to the backplane 421, but only the first bit stream $300_1$ is used as the corresponding EM bits to the corresponding disk drives. All remaining bit streams $300_2$ through $300_6$ are ignored by midplane 421.

Figure 6C:
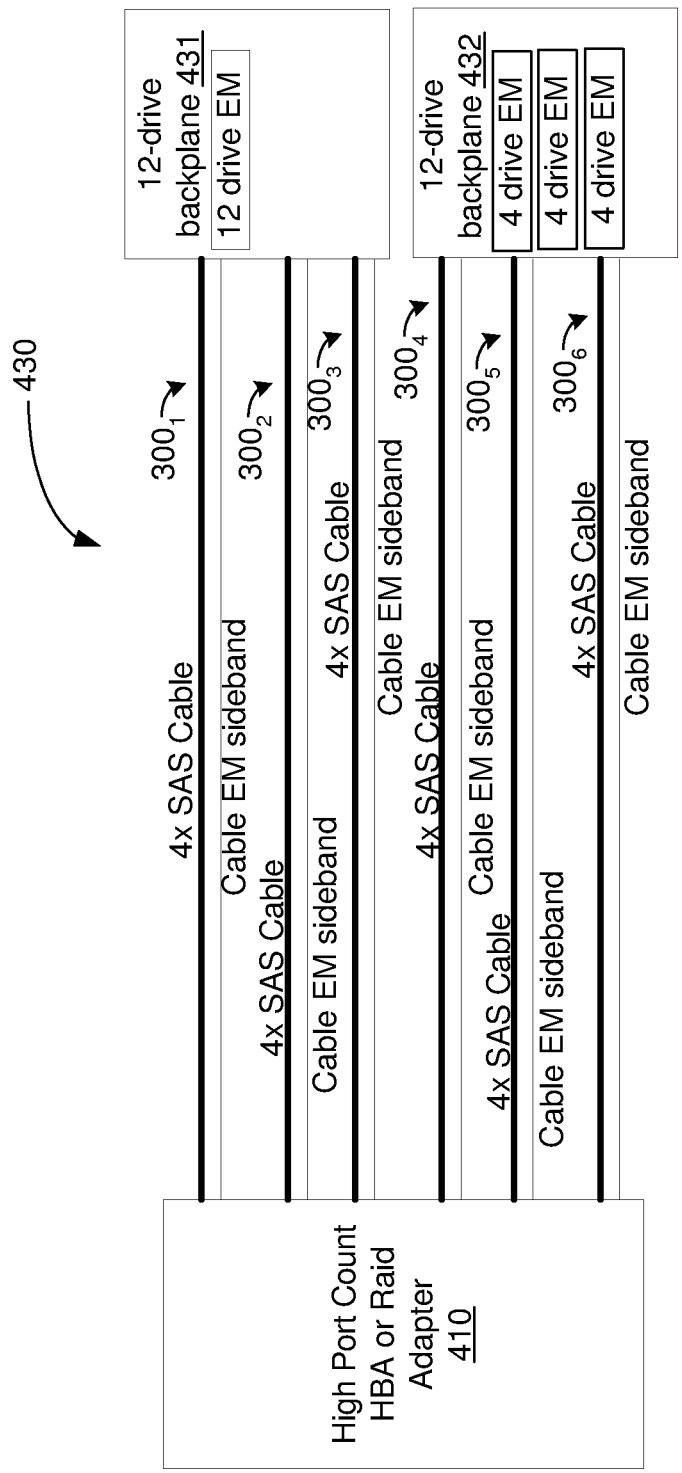

In the storage system 430 of FIG. 6C, six 4× SAS cables, each including an EM sideband, interconnect the HPC adapter 410 with two twelve-drive backplanes 431 and 432, one of which has a single group of twelve disk drives attached thereto and the other of which has three groups of four disk drives attached thereto. Each 4× SAS cable delivers four of the N EM bit streams from the adapter 410 to the backplanes 431 and 432. However, backplane 431 only uses bit stream $300_1$ for all 12 drives' EM bits, while bit streams $300_4$ through $300_6$ provide the corresponding EM bits to the corresponding disk drives for backplane 432.

Figure 6D:
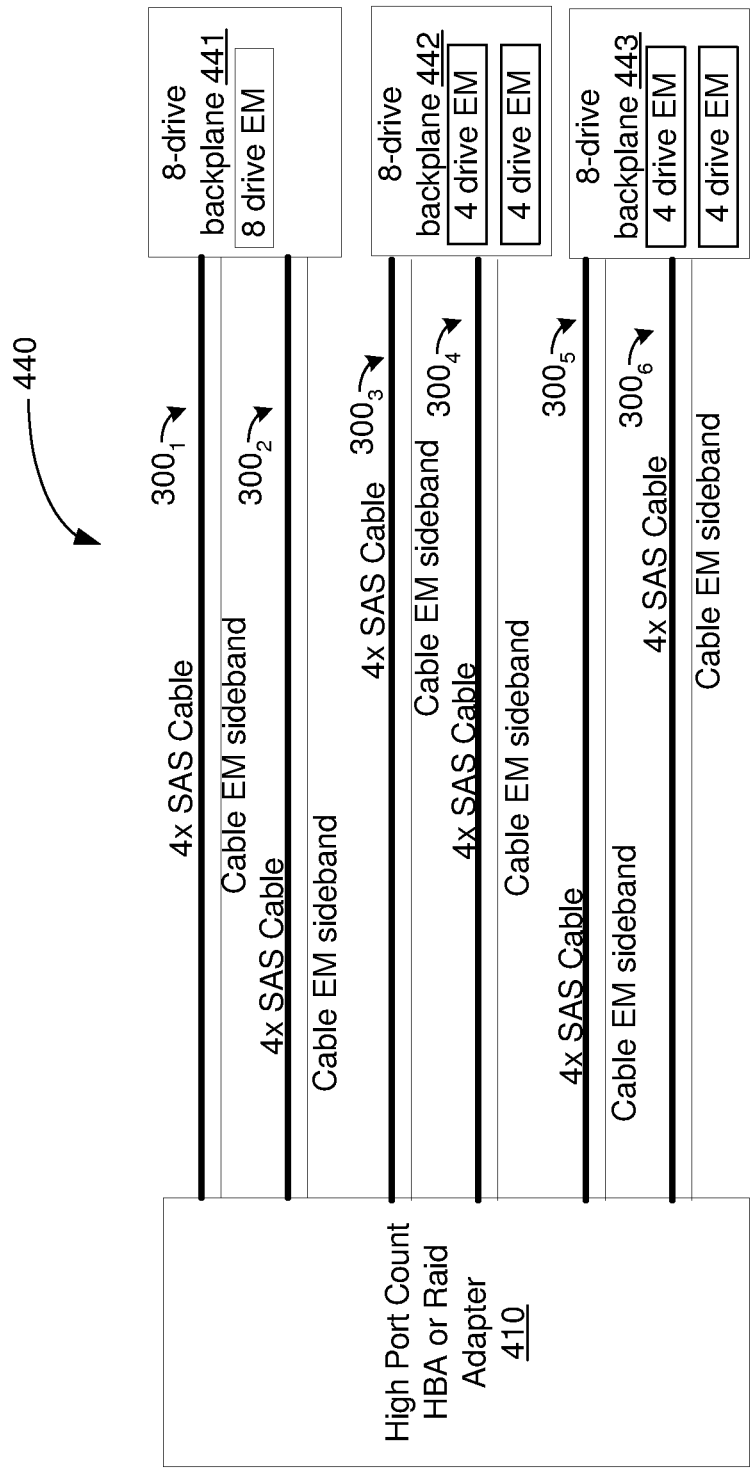

In the storage system 440 of FIG. 6D, six 4× SAS cables, each including an EM sideband, interconnect the HPC adapter 410 with three backplanes 441, 442 and 443. Backplane 441 has a single group of eight disk drives attached thereto. Backplanes 442 and 443 each have two groups of four disk drives attached thereto. Each 4× SAS cable delivers four of the N EM bit streams from the adapter 410 to the backplanes 441, 442 and 443. However, backplane 441 only uses bit stream $300_1$ for all 8 drives' EM bits, while bit streams $300_3$ through $300_6$ provide the corresponding EM bits to the corresponding disk drives for backplanes 442 and 443.

Figure 6E:
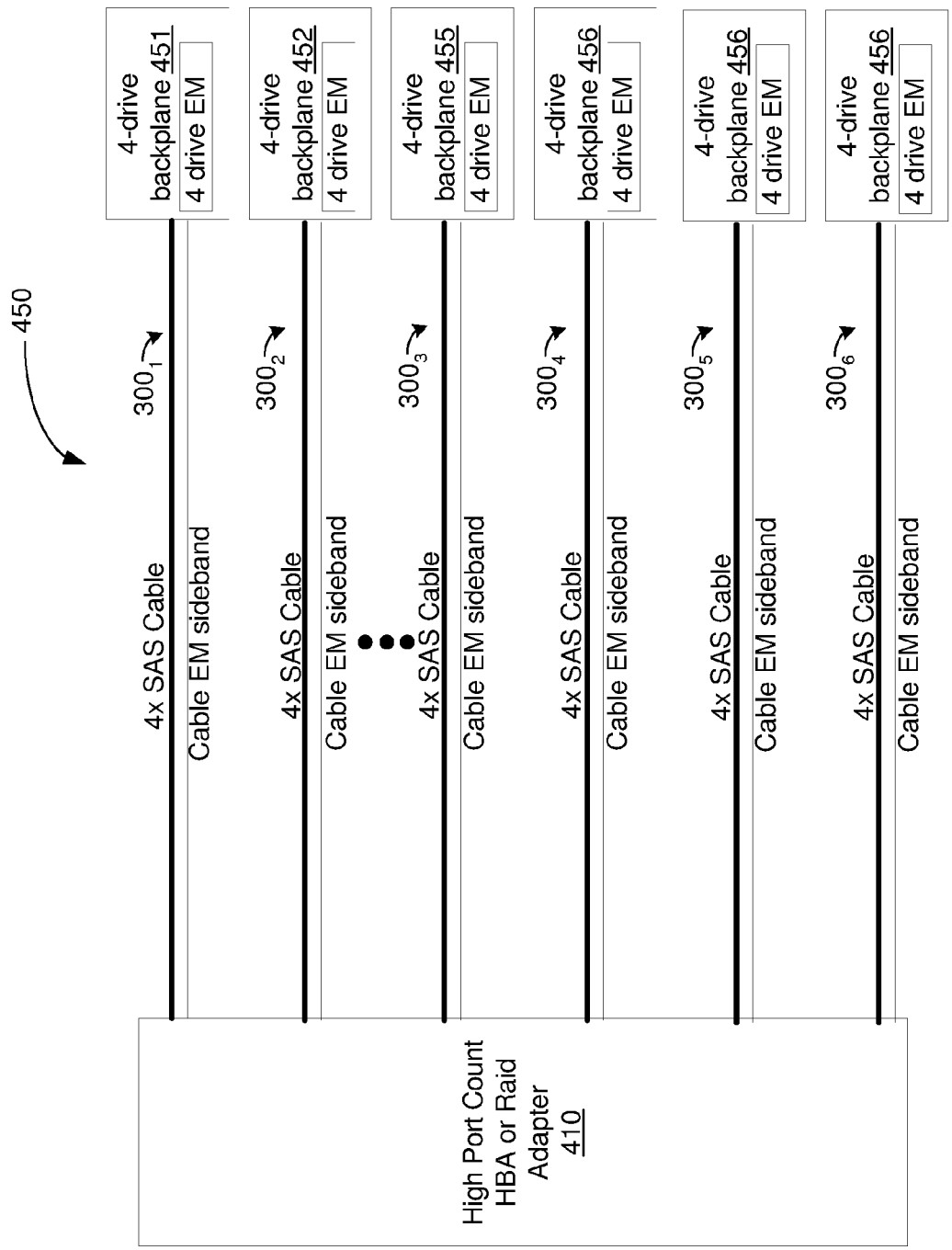

In the storage system 450 of FIG. 6E, six 4× SAS cables, each including an EM sideband, interconnect the HPC adapter 410 with six backplanes 451-456. Each of the backplanes 451-456 has a single group of four disk drives attached thereto. Each 4× SAS cable delivers four of the N EM bit streams from the adapter 410 to the backplanes 451-456, which then provide the corresponding EM bits to the corresponding disk drives.

Figure 6F:
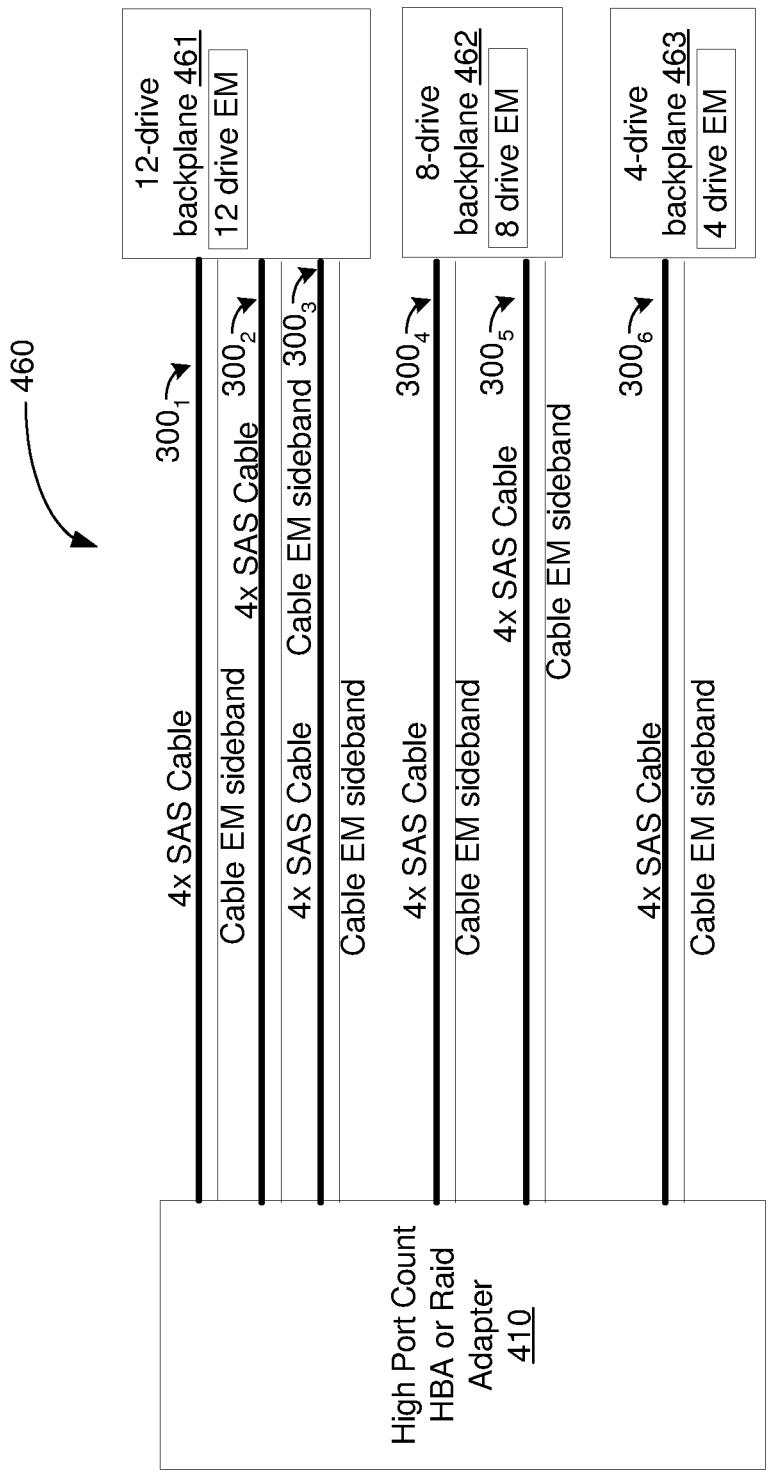

In the storage system 460 of FIG. 6F, six 4× SAS cables, each including an EM sideband, interconnect the HPC adapter 410 with three backplanes 461, 462 and 463. Backplane 461 is a twelve-disk drive backplane that has a single group of twelve disk drives attached thereto. Backplane 462 is an eight-disk drive backplane that has a single group of eight disk drives attached thereto. Backplane 463 is an eight-disk drive backplane that has two groups of four disk drives attached thereto. Each 4× SAS cable delivers four of the N EM bit streams from the adapter 410 to the backplanes 461, 462 and 463. However, backplane 461 only uses bit stream $300_1$ for all 12 drives' EM bits, while backplane 462 only uses bit stream $300_4$ for its 8 drives' EM bits. Bit stream $300_6$ provides the corresponding EM bits to the corresponding disk drives for backplane 463.

The invention is not limited to the backplane configurations depicted in FIGS. 6A-6F. The backplane configurations depicted in FIGS. 6A-6F are merely examples of a few of many possible backplane configurations that can be used with the invention and are merely intended to convey some of the concepts and principles of the invention.

It should be noted that the invention has been described above with reference to illustrative embodiments for the purposes of demonstrating the principles and concepts of the invention. Persons skilled in the art will understand that many modifications can be made to the embodiments described herein and that all such modifications are within the scope of the invention.

What is claimed is:

1. An apparatus for dividing an enclosure management (EM) serial bit stream into a plurality of EM serial bit streams, the apparatus comprising:
    a controller having at least a first EM input port for receiving an input EM serial bit stream and N EM output ports for outputting N EM serial bit streams from the controller, where N is a positive integer that is equal to or greater than 2; and
    at least a first EM separator within the controller that divides the input EM serial bit stream into N EM serial bit streams and causes each of the N EM serial bit streams to be output from the controller via a respective one of the N EM output ports to N respective midplanes each having at least one respective disk drive attached thereto.

2. The apparatus of claim 1, wherein the input EM serial bit stream is a Serial General Purpose Input/Output (SGPIO) bit stream and wherein the N EM serial bit streams are SGPIO bit streams, each of the N SGPIO bit streams comprising SGPIO bits associated with at least said at least one disk drive attached to the respective midplane.

3. The apparatus of claim 2, wherein each of the N SGPIO bit streams comprises SGPIO bits associated with said at least one disk drive attached to the respective midplane and SGPIO bits associated with higher-numbered disk drives attached to higher-numbered midplanes.

4. The apparatus of claim 1, wherein the input EM serial bit stream is an Inter-Integrated Circuit ($I^2C$) bit stream and wherein the N EM serial bit streams are $I^2C$ bit streams, each of the N $I^2C$ bit streams comprising $I^2C$ bits associated with said at least one disk drive attached to the respective midplane.

5. The apparatus of claim 4, wherein each of the N $I^2C$ bit streams comprises $I^2C$ bits associated with said at least one disk drive attached to the respective midplane and $I^2C$ bits associated with higher-numbered disk drives attached to higher-numbered midplanes.

6. The apparatus of claim 1, wherein the input EM serial bit stream is sent to the controller by an expander.

7. The apparatus of claim 1, wherein the input EM serial bit stream is sent to the controller by a host bus adapter (HBA).

8. The apparatus of claim 1, wherein the input EM serial bit stream is sent to the controller by a Redundant Array of Inexpensive Disk (RAID) adapter.

9. The apparatus of claim 1, further comprising:
    N fault header output ports for outputting N drive signals for driving N fault light-emitting diodes (LEDs), and wherein the first EM separator also identifies N fault bits associated with the N midplanes and produces the N drive signals from the N fault bits, respectively, and causes the N drive signals to be output from the N fault header output ports, respectively.

10. An apparatus for dividing one or more enclosure management (EM) serial bit streams into a plurality of EM serial bit streams, the apparatus comprising:
    a controller having at least first and second EM input ports for receiving a first input EM serial bit stream of a first EM type and second input EM bits of a second type, respectively, the controller having N EM output ports for outputting N EM serial bit streams from the controller, where N is a positive integer that is equal to or greater than 2 and
    at least a first EM separator within the controller that divides the first input EM serial bit streams into N EM serial bit streams of the first and second type;
    at least a first connection manager that manages connections between the second EM input port and other elements of the controller; and
    N multiplexors (MUXes) within the controller, each MUX having at least first and second input terminals, an output terminal, and a selection terminal, the first and second input terminals of each MUX receiving one of the N EM bits of the first type and one of the N EM bits of the second type, respectively, each of the MUXes receiving a respective selection bit from a respective midplane at the respective selection terminal and causing either the EM bit of the first type at the first input terminal or the EM bit of the second type at the second input terminal to be output from the respective MUX on the respective output terminal based on whether or not the respective selection bit is asserted, and wherein the EM serial bits that are output on the output terminals of the MUXes are output from the controller via respective EM output ports of the controller and provided to N respective midplanes.

11. The apparatus of claim 10, wherein the first type is a Serial General Purpose Input/Output (SGPIO) type and wherein the second type is an $I^2C$ type.

12. The apparatus of claim 11, wherein each of the N EM serial bit streams comprises bits associated with said at least one disk drive attached to the respective midplane and bits associated with higher-numbered disk drives attached to higher-numbered midplanes.

13. A method for dividing an enclosure management (EM) serial bit stream into a plurality of EM serial bit streams, the method comprising:
    in a controller, receiving an input EM serial bit stream;
    in the controller, dividing the input EM serial bit stream into N EM serial bit streams, where N is a positive integer that is equal to or greater than 2; and in the controller, causing each of the N EM serial bit streams to be provided via a respective EM output port of the controller to a respective midplane of the N respective midplanes, wherein each of the midplanes has at least one respective disk drive attached thereto.

14. The method of claim 13, wherein the input EM serial bit stream is a Serial General Purpose Input/Output (SGPIO) bit stream and wherein the N EM serial bit streams are SGPIO bit streams, each of the N SGPIO bit streams comprising at least SGPIO bits associated with at least said at least one disk drive attached to the respective midplane.

15. The method of claim 14, wherein each of the N SGPIO bit streams comprises SGPIO bits associated with said at least one disk drive attached to the respective midplane and SGPIO bits associated with higher-numbered disk drives attached to higher-numbered midplanes of the N midplanes.

16. The method of claim 10, wherein the input EM serial bit stream is sent to the controller by an expander.

17. The method of claim 10, wherein the input EM serial bit stream is sent to the controller by a host bus adapter (HBA).

18. The method of claim 10, wherein the input EM serial bit stream is sent to the controller by a Redundant Array of Inexpensive Disk (RAID) adapter.

19. The method of claim 10, further comprising:
in the first EM separator, identifying N fault bits associated with the N midplanes, respectively, and producing N drive signals from the N fault bits, respectively, and causing the N drive signals to be output from N fault header output ports, respectively, of the controller.

20. A method for dividing an enclosure management (EM) serial bit stream into a plurality of EM serial bit streams, the method comprising:
in a controller, receiving a first input EM serial bit stream of a first type and second EM bits of a second type;

with a first EM separator of the controller, dividing the first input EM serial bit stream into N EM serial bit streams of the first type;

in the controller, providing the EM bits of the N EM serial bit streams of the first type to first input terminals of N multiplexors (MUXes) of the controller and providing the EM bits of the second type to second input terminals of the N MUXes;

in the controller, providing respective selection bits received from N respective midplanes to respective selector terminals of the respective MUXs; and in each respective MUX, based on whether or not the respective selection bit is asserted, causing either the EM bit of the EM serial bit stream of the first type at the respective first input terminal of the respective MUX or the EM bit of the second type at the respective second input terminal of the respective MUX to be output from the respective MUX on the respective output terminal, and wherein the EM bits that are output on the output terminals of the MUXes are output from the controller via respective EM output ports of the controller and provided to the N respective midplanes.

21. The method of claim 20, wherein the first type is a Serial General Purpose Input/Output (SGPIO) type and wherein the second type is an Inter-Integrated Circuit ($I^2C$) type.

22. The method of claim 20, wherein each of the N EM serial bit streams comprises bits associated with said at least one disk drive attached to the respective midplane and bits associated with higher-numbered disk drives attached to higher-numbered midplanes.

* * * * *